UNITED STATES PATENT OFFICE.

AMOS HOLBROOK, JR., OF LYNN, MASSACHUSETTS.

IMPROVEMENT IN DEVICES FOR HEATING WAXED THREADS IN SEWING-MACHINES.

Specification forming part of Letters Patent No. 43,209, dated June 21, 1864; Reissue No. 1,831, dated December 6, 1864.

*To all whom it may concern:*

Be it known that AMOS HOLBROOK, Jr., of Lynn, in the county of Essex, in the State of Massachusetts, invented an Improvement in Rotating Horn Sewing-Machines; and we, the aforesaid HOLBROOK, and WM. F. SPINNEY and F. W. G. LEWIS, also of Lynn aforesaid, the owners thereof, do hereby declare that the following, taken in connection with the drawing which accompanies and forms part of this specification, is a sufficient description of the said invention to enable those skilled in the art to practice it.

Said invention consists in an improvement by which gas is conveniently used as a means for heating the rotating horn of the sole-sewing machine shown and described in the United States Letters Patent granted for the invention of Messrs. McKay and Mathies, August 12, 1862, and numbered 36,163, the gas so employed being a cheap substitute for alcohol, oil, &c., thereby making a material daily saving in the cost of operating each of such of the aforesaid sewing-machines as this invention may be applied to, besides having advantages in the matters of cleanliness and ease of management. It is well known that in operating these sole-sewing machines it is necessary to heat the horn in order to keep the wax upon the thread soft and the thread flexible during the sewing process. It is also well known to those who operate the said rotating horn sewing-machine that its horn is mounted on a vertical tubular shaft, within which is a small vertical shaft which operates the device which lays the thread into the hook of the needle. Said small vertical shaft occupies the axis of rotation of the horn-bearing shaft and renders it necessary to adopt some peculiar arrangement to convey gas to a burner placed in convenient position upon or under the horn, which shall not interfere with the rotation of the horn and the parts therewith immediately connected.

Prior to this invention a slack flexible hose was used to convey the gas to the burner; but this involved the unwinding of the hose from the horn-supporting shaft as often as it became tightly wound up thereupon during the operation of the machine in sewing around soles, and the trouble and loss of time involved in this more than counterbalanced any advantages arising from the use of gas for heating.

This invention is illustrated in the accompanying drawing, which shows the rotating horn and its supporting rotating shaft in elevation and a portion of the sewing-machine frame which receives and supports said shaft.

Fixed to the frame will be seen in section a small reservoir, *a*, within which, but not in contact therewith, is another smaller reservoir or inverted cup, *b*, (also seen in section,) which is secured to the horn-shaft and rotates with it. The large lower reservoir is partly filled with fluid, so that the lower open end of *b* is immersed therein, the normal level of the fluid being represented in blue lines, above which level is a space in *b* into which the gas-supply pipe debouches, the two cups *a* and *b* and the fluid forming what may be briefly termed a "gas-receptacle," one part of which may be freely turned in the other without escape of gas and without wear or other derangement by which leakage of gas would ensue.

From the space in the upper part of *b* a pipe leads in any convenient manner to the point where the gas is consumed. The said pipe, being a fixture to the horn-shaft and its appurtenances, of course rotates with the horn. The fluid used in the cup *a* may be mercury, water, alcohol, or other suitable substance. Pressure in the cup *b* must be regulated by a cock in the gas-supply pipe, so as not to blow the fluid out of and over the top edge of *a*. Where the height of *a* is small and the pressure liable to be considerable mercury is the best fluid for use. No peculiar form of burner or location for one is specified, as these matters may be varied. Any form of gas-burner which mingles air with the gas, so that in burning it consumes with a low blue flame, giving little light and no smoke, is well adapted for use in this connection.

For convenience a cock or other provision may be arranged in connection with *a* by which the fluid may, when required, be drawn off from *a*, and to prevent the fluid from becoming foul from accidental droppings into it the top of *b* extends over *a* like a flange or cover.

We claim—

Combining with the rotating horn of a sewing-machine a conduit for supplying gas to a burner to heat the horn, when so arranged as not to interfere with the free continued rotation of the horn in either direction or the supply of gas to the burner.

AMOS HOLBROOK, JR.
F. W. G. LEWIS.
WM. F. SPINNEY.

Witnesses:
J. B. CROSBY,
F. GOULD.